United States Patent
Malhotra et al.

(10) Patent No.: US 11,669,550 B2
(45) Date of Patent: Jun. 6, 2023

(54) SYSTEMS AND METHODS FOR GROUPING SEARCH RESULTS INTO DYNAMIC CATEGORIES BASED ON QUERY AND RESULT SET

(71) Applicant: Apple Inc., Cupertino, CA (US)

(72) Inventors: Anubhav Malhotra, Sunnyvale, CA (US); John M. Hörnkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 16/731,977

(22) Filed: Dec. 31, 2019

(65) Prior Publication Data

US 2020/0133960 A1    Apr. 30, 2020

Related U.S. Application Data

(62) Division of application No. 15/721,197, filed on Sep. 29, 2017, now abandoned.

(60) Provisional application No. 62/514,717, filed on Jun. 2, 2017.

(51) Int. Cl.
*G06F 16/248* (2019.01)
*G06F 16/28* (2019.01)
*G06F 16/22* (2019.01)
*G06F 16/951* (2019.01)

(52) U.S. Cl.
CPC ........ *G06F 16/285* (2019.01); *G06F 16/2228* (2019.01); *G06F 16/248* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 7,345,671 | B2 | 3/2008 | Robbin et al. |
| 7,627,343 | B2 | 12/2009 | Fadell et al. |
| 8,122,029 | B2 | 2/2012 | Loofbourrow et al. |
| 8,380,743 | B2 | 2/2013 | Convertino et al. |
| 9,384,211 | B1 | 7/2016 | Castillo et al. |
| 10,200,824 | B2 | 2/2019 | Gross et al. |
| 10,534,783 | B1 | 1/2020 | Raczko et al. |
| 10,621,189 | B2 | 4/2020 | Lin et al. |
| 10,621,246 | B2 | 4/2020 | Malhotra et al. |
| 11,210,301 | B2 | 12/2021 | De Almeida Forjaz De Lacerda et al. |
| 2005/0192955 | A1 | 9/2005 | Farrell |
| 2007/0033191 | A1 | 2/2007 | Hornkvist et al. |
| 2007/0033531 | A1 | 2/2007 | Marsh |
| 2007/0250501 | A1 | 10/2007 | Grubb et al. |

(Continued)

OTHER PUBLICATIONS

Miarcin Rudolf, "In Pursuit of a Perfect App Search Engine, From Generic App Search Queries to Intent Discovery", http://sites.google.com/site/appweb2012/home/files/Xyologic-slides.pdf, 2012, 45 pages.

*Primary Examiner* — Wilson Lee
(74) *Attorney, Agent, or Firm* — Aikin & Gallant, LLP

(57) ABSTRACT

A method and apparatus of a device that indexes donated content from an application on a device is described. In an exemplary embodiment, the device receives donated content for an application object from the application. The device further associates a metadata tag for a topic to the donated content. In addition, the device indexes the donated content with the metadata tag in a local search index of the device.

23 Claims, 8 Drawing Sheets

(56) References Cited

U.S. PATENT DOCUMENTS

| | | |
|---|---|---|
| 2007/0255755 A1 | 11/2007 | Zhang et al. |
| 2008/0005086 A1* | 1/2008 | Moore .................. G06F 16/955 |
| 2008/0071929 A1* | 3/2008 | Motte ..................... H04L 67/02 |
| | | 709/246 |
| 2008/0195664 A1 | 8/2008 | Maharajh et al. |
| 2009/0271283 A1 | 10/2009 | Fosnacht et al. |
| 2010/0262608 A1 | 10/2010 | Hornkvist |
| 2010/0268700 A1* | 10/2010 | Wissner ................ G06F 16/951 |
| | | 707/706 |
| 2011/0113052 A1 | 5/2011 | Hornkvist et al. |
| 2011/0125744 A1* | 5/2011 | Immonen ............... G06F 16/29 |
| | | 707/737 |
| 2012/0109970 A1 | 5/2012 | Hornkvist et al. |
| 2012/0159337 A1* | 6/2012 | Travilla .............. G06Q 30/0631 |
| | | 715/738 |
| 2012/0203764 A1 | 8/2012 | Wood et al. |
| 2012/0290950 A1* | 11/2012 | Rapaport ........... H04N 21/8358 |
| | | 715/753 |
| 2013/0151549 A1 | 6/2013 | Papamiltiadis et al. |
| 2014/0172821 A1 | 6/2014 | Hu et al. |
| 2014/0181186 A1 | 6/2014 | Stevens et al. |
| 2014/0207776 A1* | 7/2014 | Harris .................... G06N 5/022 |
| | | 707/737 |
| 2014/0250098 A1 | 9/2014 | Kasterstein et al. |
| 2015/0100569 A1 | 4/2015 | Reid De Sousa |
| 2015/0161212 A1 | 6/2015 | Yang et al. |
| 2015/0186369 A1 | 7/2015 | Yan et al. |
| 2016/0049083 A1* | 2/2016 | Brinton .................. G09B 5/12 |
| | | 434/309 |
| 2016/0055225 A1 | 2/2016 | Xu et al. |
| 2016/0070731 A1* | 3/2016 | Chang .................... G06Q 30/00 |
| | | 707/741 |
| 2016/0098405 A1* | 4/2016 | Gorbansky ....... G06F 16/24578 |
| | | 707/749 |
| 2016/0210061 A1* | 7/2016 | Soncodi ................ G06F 3/0605 |
| 2016/0357808 A1 | 12/2016 | Morris et al. |
| 2016/0357831 A1 | 12/2016 | Linn et al. |
| 2017/0041296 A1* | 2/2017 | Ford .................... G06F 16/951 |
| 2017/0052967 A1 | 2/2017 | Castillo et al. |
| 2017/0132227 A1 | 5/2017 | Bostick et al. |
| 2017/0169401 A1* | 6/2017 | Beane ............... G06Q 30/0278 |
| 2017/0357650 A1 | 12/2017 | De Almeida Forjaz De Lacerda et al. |
| 2018/0067945 A1* | 3/2018 | Jain ..................... G06F 16/9024 |
| 2018/0192156 A1* | 7/2018 | Xu ....................... H04N 21/654 |
| 2018/0260417 A1 | 9/2018 | Mahadevan et al. |
| 2018/0349467 A1 | 12/2018 | Malhotra et al. |
| 2020/0097840 A1* | 3/2020 | Burns .................... H04L 65/60 |

\* cited by examiner

SYSTEMS AND METHODS FOR GROUPING SEARCH RESULTS INTO DYNAMIC CATEGORIES BASED ON QUERY AND RESULT SET

CROSS-REFERENCE TO RELATED APPLICATIONS

This application claims the benefit of and is a divisional of co-pending Non-Provisional patent application Ser. No. 15/721,197, filed Sep. 29, 2017, which claims the benefit of Provisional Patent Application No. 62/514,717, filed Jun. 2, 2017, both of which are incorporated herein by reference.

FIELD OF INVENTION

This invention relates generally to search technology and more particularly to grouping search results into dynamic categories.

BACKGROUND OF THE INVENTION

A user will often perform a query search to lookup information on the Web or from some other data sources, such as for objects local to the device the user is using. A query search begins with a client receiving the query string, which is sent to a search server and/or a local search service. The search server receives query string and searches a search index for results that match this query string. The search server then returns the results to the client. If the query string is sent to the local search service, the local search service performs the search using a local search index and returns the search results. Each of the results from either source will include a ranking score that is used to rank and present the search results. The search results with a higher ranking are presented higher than results with a lower ranking.

Typically, the search results are presented in the rank order based rankings for each of the search results. Alternatively, sets of search results can be presented in groups, where each of the groups represents search performed in a particular search domain that is known to the device or search server at the time of the search. However, these different search domains are static and do not change over a period of time or based on the type of content returned in the search results.

SUMMARY OF THE DESCRIPTION

A method and apparatus of a device that indexes donated content from an application on a device is described. In an exemplary embodiment, the device receives donated content for an application object from the application. The device further associates a metadata tag for a topic to the donated content. In addition, the device indexes the donated content with the metadata tag in a local search index of the device.

In a further embodiment, the device receives a query search for objects indexed in the local search index. In addition, the device performs the query search using local search index to obtain a set of search results that includes the donated content. Furthermore, the device categorizes at least some of the set of search results using at least the metadata tag of the donated content. The device additionally, generates the metadata tag for the donated content. The device can generate the metadata tag by performing latent semantic analysis on the object, extracting at least one topic from the latent semantic analysis, and adding the at least one topic to the metadata tag for the object. Alternatively, the device can generate the metadata tag by retrieving an application category for the application and adding the application category to the metadata tag as a topic for the object. This application category can be retrieved from an application store. As a further embodiment, the device can generate the metadata tag by retrieving a set of tags from the application and the application determines the set of tags based on at least a publicly set of available tags.

In another embodiment, a method and apparatus of a device that categorizes a plurality of search results is described. In an exemplary embodiment, the device receives a plurality of search results. In addition, the device determines a category for at least a subset of the search results, where the category is determined using a metadata tag for a corresponding one of the subset of search results and the metadata tag and the corresponding one of the subset of search results is retrieved from a local search index stored on the device. Furthermore, the device presents the subset of the search results to a user of the device.

In addition, the metadata tag includes topic information. The topic information can be generated from a latent semantic analysis of an object corresponding to the one of the subset of search results. Alternatively, the topic information can be generated from category information of an application that donated an object corresponding to the one of the subset of search results. In a further embodiment, the topic information can be generated from a tag determined by an application that donated an object corresponding to the one of the subset of search results.

Furthermore, the metadata tag is stored in a local search index. In addition, the device determines a category by determining overlapping topic information from the subset of search results. The overlapping topic information can be the same topic for each of the subset of search results or can be a set of related topics associated with the subset of search results. The device further presents the subset of the search results with the category.

In one embodiment, a machine-readable medium having executable instructions to cause one or more processing units to perform a method to index donated content from an application on a device is described. In an exemplary embodiment, the machine-readable medium method receives donated content for an application object from the application. The machine-readable medium method further associates a metadata tag for a topic to the donated content. In addition, the machine-readable medium method indexes the donated content with the metadata tag in a local search index of the device.

In a further embodiment, the machine-readable medium method receives a query search for objects indexed in the local search index. In addition, the machine-readable medium method performs the query search using local search index to obtain a set of search results that includes the donated content. Furthermore, the machine-readable medium method categorizes at least some of the set of search results using at least the metadata tag of the donated content. The machine-readable medium method additionally generates the metadata tag for the donated content. The machine-readable medium method can generate the metadata tag by performing latent semantic analysis on the object, extracting at least one topic from the latent semantic analysis, and adding the at least one topic to the metadata tag for the object. Alternatively, the machine-readable medium method can generate the metadata tag by retrieving an application category for the application and adding the application category to the metadata tag as a topic for the object. This application category can be retrieved from an application store. As a further embodiment, the machine-readable medium method can generate the metadata tag by retrieving a set of tags from the application and the application determines the set of tags based on at least a publicly set of available tags.

In a further embodiment, a method to index donated content from an application on a device is described. In an exemplary embodiment, the method receives donated content for an application object from the application. The method further associates a metadata tag for a topic to the donated content. In addition, the method indexes the donated content with the metadata tag in a local search index of the device.

In another embodiment, a machine-readable medium method having executable instructions to cause one or more processing units to perform a method to categorize a plurality of search results is described. In an exemplary embodiment, the machine-readable medium method receives a plurality of search results. In addition, the machine-readable medium method determines a category for at least a subset of the search results, where the category is determined using a metadata tag for a corresponding one of the subset of search results and the metadata tag and the corresponding one of the subset of search results are retrieved from a local search index stored on the device. Furthermore, the machine-readable medium method presents the subset of the search results to a user of the device.

In addition, the metadata tag includes topic information. The topic information can be generated from a latent semantic analysis of an object corresponding to the one of the subset of search results. Alternatively, the topic information can be generated from category information of an application that donated an object corresponding to the one of the subset of search results. In a further embodiment, the topic information can be generated from a tag determined by an application that donated an object corresponding to the one of the subset of search results.

Furthermore, the metadata tag is stored in a local search index. In addition, the machine-readable medium method determines a category by determining overlapping topic information from the subset of search results. The overlapping topic information can be the same topic for each of the subset of search results or can be a set of related topics associated with the subset of search results. The machine-readable medium method further presents the subset of the search results with the category.

In another embodiment, a method to categorize a plurality of search results is described. In an exemplary embodiment, the method receives a plurality of search results. In addition, the method determines a category for at least a subset of the search results, where the category is determined using a metadata tag for a corresponding one of the subset of search results and the metadata tag and the corresponding one of the subset of search results is retrieved from a local search index stored on the device. Furthermore, the method presents the subset of the search results to a user of the device.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
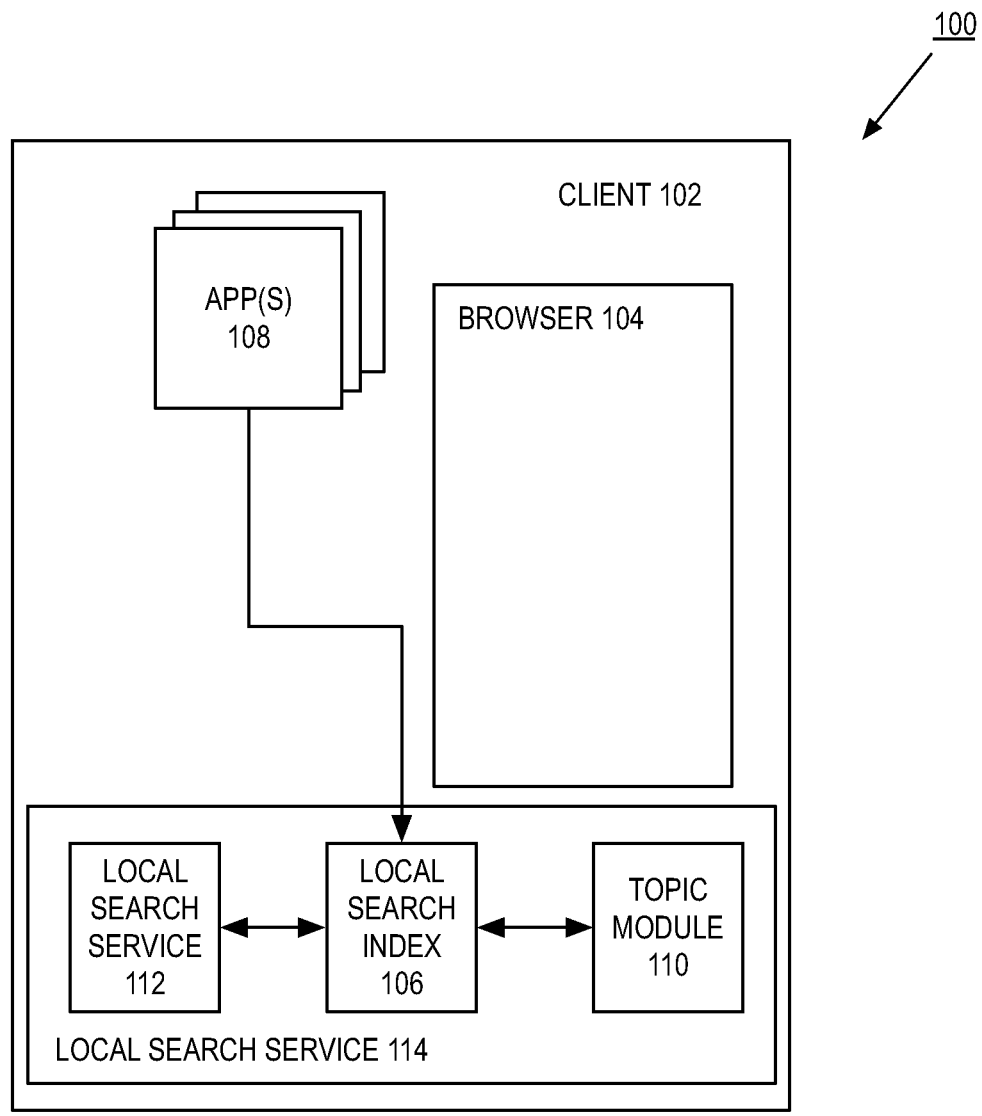
FIG. 1 is a block diagram of one embodiment of a client that has applications donating content to a local search index.

A method and apparatus of a device that indexes donated content from an application on a device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that indexes donated content from an application on a device and dynamically categorizes search results is described. In one embodiment, the device includes one or more applications that donate content to a local search index on the device. In this embodiment, the donated content can be metadata relating to one or more objects that are created, used, modified, and/or otherwise associated with the corresponding application. In addition, the device indexes the donated content in the local search index.

In one embodiment, the device determines topic information for each of the donated content from the one or more applications. The device can determine topic information by performing latent semantic analysis to determine topic for the donated content, determining topics based on application categories, using application donated tags, another mechanism to tag the donated content, and/or a combination therein. In this embodiment, the topic information can be stored in the local search index.

In one embodiment, the device can use the topic information in the local search index to group, or equivalently categorize, search results from the local search index. In this embodiment, the device receives a search query and performs a search using the local search index and the search query. The device receives the search results for the query, which can include topic information for a multiple of received search results. The device determines which of the search results has overlapping topics. In one embodiment, the overlapping topics can be the same topic for a subset of the search results. Alternatively, the overlapping topics can be a set of related topics for a subset of the search results. The device can use the overlapping topics to categorize the search results.

FIG. 1 is a block diagram of one embodiment of a client 102 that has applications donating content to a local search index. In FIG. 1, the client 102 includes a browser 104, local search service 114, and one or more applications 108. In one embodiment, the local search service 114 includes a local search index 106, topic module 110, and local search service 112. In one embodiment, the client 102 can be a personal computer, laptop, server, mobile device (e.g., smartphone, laptop, personal digital assistant, music playing device, gaming device, etc.), and/or any device capable requesting a search and/or displaying search results. In one embodiment, the client 102 can be a physical or virtual device. In one embodiment, the smartphone can be a cellular telephone that is able to perform many functions of client 102.

In one embodiment, browser 104 can be a web browser and/or a file browser. In this embodiment, the browser 104 can be used to request and view various types of documents that accessible from the server. Furthermore, the browser 104 can include a search input field that is used by the user to input the search query. In one embodiment, a web browser is a program that allows a user to search the web and/or other search domains and retrieve for various types of documents. In an alternative embodiment, the browser 104 can be another type of application that allows a user to retrieve one or more documents and/or input a search query, which is used to search on-device and/or off-device search domains. In one embodiment, the browser 104 includes a search input field, where the search input field is used by the user to input a search request string.

In one embodiment, the client 102 can includes additional applications (including applications 108 and/or other applications not illustrated) that use a local search service 112 to perform a search of objects stored on the client 102. In this embodiment, a search is a search of the objects stored on the client 102. For example and in one embodiment, the objects can be documents, pictures, music, applications, email, calendar entries, and/or other types of objects stored in the client 102. In one embodiment, the search is based on a local search index 106 that is maintained by the client 102. In this embodiment, the index is an index of the metadata stored in objects of the device.

In one embodiment, each of the metadata stored in the index has a type. For example and in one embodiment, the metadata types can include a creation date, modification date, upload date, files size, file type, attachment type (PDF, JPEG, etc.), metadata types within the object (e.g., "To," "From," "CC," "Subject," ID3 tags with media, "Date," "Time," "location," "name," "address," etc.), and/or other data types stored within each of the objects. The metadata contents and types are stored in the local search index 106. To search this index 106, the applications can each capture a query prefix and send this query prefix to the local search service 112, which in turn, uses the query prefix to perform the search using the local search index 106. For example and in one embodiment, a mail application includes a search field to search for relevant emails or used for a general search using the local search service. Similarly, the applications calendar, media player, file browser, and/or other applications (e.g., contacts) can use local search service 112 to search for objects stored on the device 100. In one embodiment, the local search service 112 can be used by the applications 108 and/or other components of the client 102 to perform searches of the local search index 106.

As described above, and in one embodiment, the client 102 can include one or more applications. In one embodiment, each of the applications 108 is an executing program that progresses through a series of states while that application is running. For example and in one embodiment, an application 108 can be a word processing application, spreadsheet, contacts, mail, phone, web browser, media player, review application, classified advertisement application, social networking, productivity, utility, game, real estate, photo, video, e-commerce, storefront, coupon, operating system, and/or any other type of application that can run on the device.

In one embodiment, one, some, and/or all of the applications 108 can donate content to the local search index. In this embodiment, the donated content can be metadata relating to one or more objects that are created, used, modified, and/or otherwise associated with the corresponding application. For example and in one embodiment, a word processing application can donate information regarding word processing documents known to the word processing application, such as file name, author, document text, size, number of words, file dates and/or any type of metadata associated with a word processing document. A media program can donate information relating media objects (e.g., music, video, books, podcasts, and/or other types of media objects) known to the media program, such as media content name, performer, album or movie name, duration, genre, recording date, comments, type of encoding, sample rate, bitrate, track or clip number, size, and/or any other type of metadata associated with a media program. A communication application can donate various types of metadata about messages known to this application (e.g., instant messages, texts, emails, and/or other types of messages), such as To, From, Subject, Body, Date, Time, Protocol, and/or any other type of metadata associated with a communication application. In addition, a contacts application can donate information regarding various types of contacts, such as type of contact, name, address, type of contact, phone number(s), type of phone number, business name, zip code, image, and/or any other type of metadata associated with the contacts application. Furthermore, an image program can donate metadata about images, such as size, dimensions, encoding type, name, color space, color profile, and/or any other type of metadata associated with an image program. A calendar application can donate information regarding calendar entries, such as date, time, title, entry name, calendar name, entry text, and/or any other type of metadata associated with the calendar application. A reminder application can donate information regarding reminders (e.g., reminders, to-do, and/or any other type of reminder), such as reminder name, due date, date created, alert date, repeat indicator, and/or any other type of metadata associated with the reminder application. In addition, any other application that wants to donate contents to be searchable. In this embodiment, the local search index indexes this donated content, such that these objects can be available to a search service. In one embodiment, by keeping the topic information in the local search index, this topic information remains local to the client 102 and is not exposed outside of the client 102.

In addition, and as described above, each of the applications 108 progresses through a series of states while that application is executing. In one embodiment, one of these application states is a snapshot in time of the application. For example and in one embodiment, the application state can be indexed locally as described in the co-pending U.S. patent application Ser. No. 14/871,900, entitled "In-Application History Search," filed on Sep. 30, 2015 and incorporated herein.

In one embodiment, each of the objects from the different applications 108 can be tagged with metadata. For example and in one embodiment, the metadata can include the types of metadata described above (e.g., creation date, modification date, upload date, files size, file type, attachment type (PDF, JPEG, etc.), metadata types within the object (e.g., "To," "From," "CC," "Subject," ID3 tags with media, "Date," "Time," "location," "name," "address," etc.), and/or other data types as described above).

In a further embodiment, the metadata can include information about one or more topics related the donated content. Each of the objects can have a one, none, or multiple topics associated with that object. In one embodiment, a topic for an object can be a subject or theme of the content and/or metadata of that object. In this embodiment, the topics for an object can be indexed along with any other metadata for that object in the local search index 106.

In one embodiment, the topic module 110 determines topics for the content donated by the applications 108. In this embodiment, a topic for the donated content is a subject or theme of the donated content. In one embodiment, the topic module 110 is a background daemon that periodically determines topics for content donated to the local search index 106.

The topic module 110, in one embodiment, can perform one or more different ways to determine topics for the donated content from an application. For example and in one embodiment, a topic module 110 can perform latent semantic analysis on the content being indexed. In this example, the latent semantic analysis is a technique that analyzes relationships between a set of objects and the terms they contain by producing a set of concepts related to the content of the objects. The set of concepts related to the objects can be topics for these objects. While in one embodiment, the topic module 110 performs latent semantic analysis to produce a set of concepts, in alternate embodiments, the topic module 110 can perform a different type of analysis to determine the set of concepts (e.g., Explicit semantic analysis, Latent Dirichlet allocation, Hierarchical Dirichlet process, Non-negative matrix factorization, Expectation Maximization and/or another type of analysis to produce a set of concepts related to the content of the objects).

In another embodiment, a topic for an object can be determined based on the application 108 related to this object. In this embodiment, a topic can be determined based on a category for this application, such as a category determined from an application store for this application. For example and in one embodiment, an application 108 is retrieved from an application store for this client 102. In this example, this application can be categorized with one or more categories in the application store. For example and in one embodiment, by type (e.g., productivity, games, graphics, etc.), use (e.g., apps for photographers, apps for designers, explore your creativity, invaluable utilities, etc.), timeliness (e.g., "What's new?"), rating (e.g., top apps, top free apps, top grossing apps, etc.), and/or another categorization of an application 108 in the application store. Each of the categories for this application 108 can be used as a topic for the application.

In a further embodiment, a topic for the donated content can be determined from application donated tags, where the application generated the donated tags using a set of well-known tags. In this embodiment, the well-known tags can be WIKIPEDIA categories, and/or other types of tags accessible to the client 102.

Figure 2:
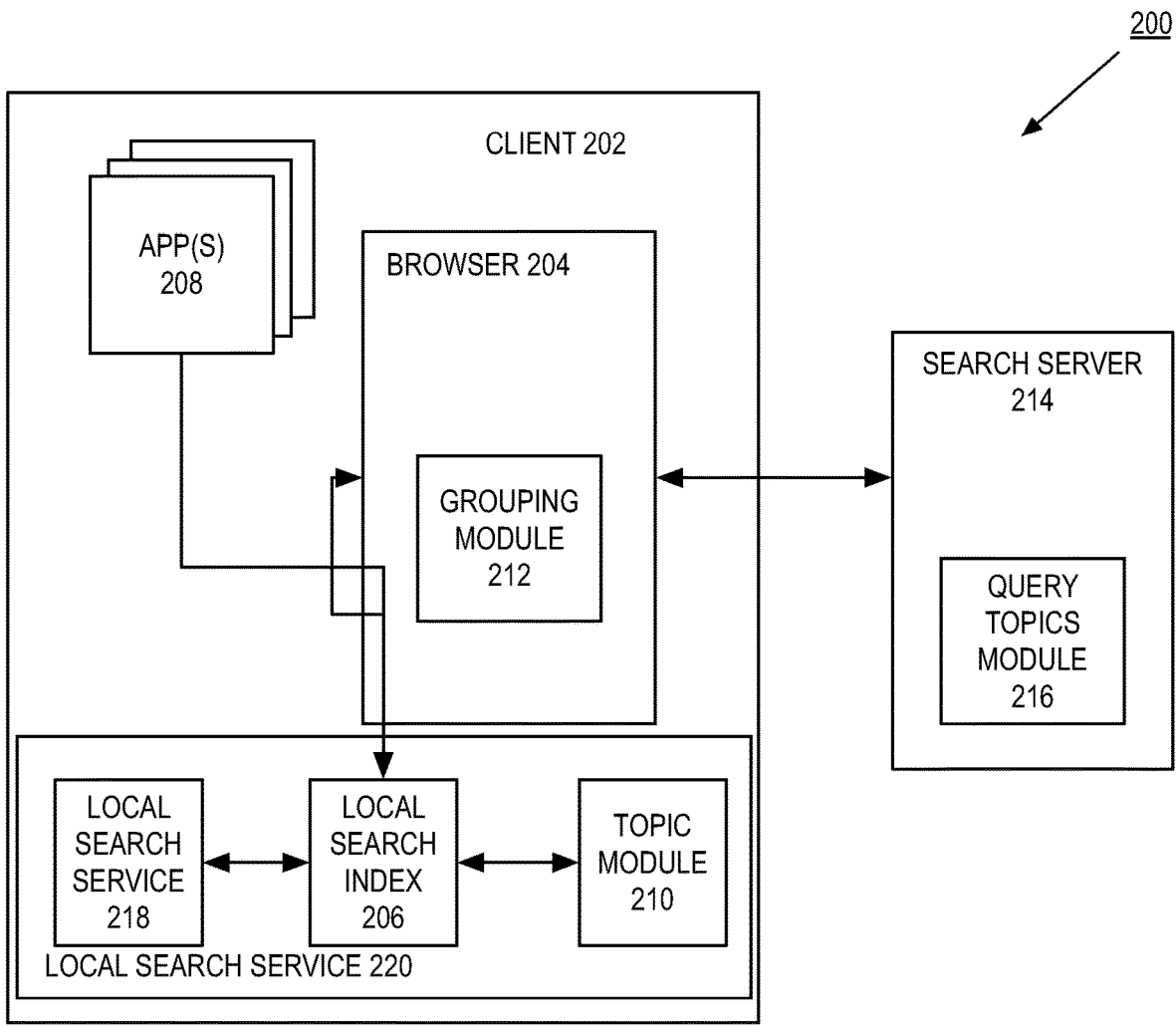
FIG. 2 is a block diagram of one embodiment of a system that includes a client performing a local and/or remote search.

With the topic information storied in the local search index, the topic information can be used to group search results for results with similar or overlapping topics. FIG. 2 is a block diagram of one embodiment of a system that includes a client performing a local and/or remote search. In FIG. 2, the client 202 includes a browser 204, local search service 220, and one or more applications 208. In one embodiment, the local search service 218 includes a local search index 206, topic module 210, and local search service 218. In one embodiment, browser 204, local search service 220, and one or more applications 208 are the same or similar to the browser 104, local search service 114, and one or more applications 108 as described in FIG. 1 above. In one embodiment, the local search index 206 includes content donated from applications 208 that include topic information determined by the topic module 210.

Furthermore, the client 202 is coupled to a search server 214. In one embodiment, the search server 214 can be a personal computer, laptop, server, mobile device (e.g., smartphone, laptop, personal digital assistant, music playing device, gaming device, etc.), and/or any device capable requesting a search and/or displaying search results. In one embodiment, the search server 214 can be a physical or virtual device.

In addition, and in another embodiment, the browser 204 can send search requests to the search server 214, local search index 206, or both for the same search request. In this embodiment, the browser 204 receives a search query from a source (e.g., the user inputs the search query), sends this search query to the search target (e.g., the local search index 206, search server 214, or both), and receives the search results. In one embodiment, the search results include topic information. For search results returned from the local search index 206, the search results can include topic information for one, some, or all of the returned search results. For example and in one embodiment, for a query with the term "credit," the local search index 206 can return results from financial applications stored on the client 202.

In addition, and in one embodiment, search results from the search server 214 can also include topic information. In this embodiment, the search server 214 parses the query and generates a result set that may be annotated with the high-level category using the same set of well-known tags that will be used on-device for categorization. Once this result-set is received on device, results with the same category, be it local or server, can be merged to provide a result set that has dynamic categories listed. For example and in one embodiment, for a query that is includes a United State politician's name, the search server 214 returns a set of news results with the category as United State Politics. In addition, a local news application can also donate news articles that are annotated as United States Politics by the tagger. Both of these result sets will be merged to form a single category of 'News—US Politics.'

In one embodiment, the search server 214 incudes a query topics module 216 that retrieves topics information and applies this topic information to the search results from the search server 214. In this embodiment, the topic information can be a topic model as described in U.S. patent application Ser. No. 15/356,189, entitled "Client-Side Search Result Re-Ranking" filed on Nov. 18, 2016 and incorporated herein.

With the received search results, a grouping module 212 of the browser can group these results using at least the topics associated with each of the search results. In this embodiment, the received search results can have overlapping topics, where at least one multiple of search results share a common or same topic, or alternatively the grouped search results can have related topics that can be grouped into one category. In one embodiment, the grouping module 212 uses these groupings to dynamically present grouped search results. In this embodiment, search results with overlapping topics can be grouped together and presented in a category with the name of the overlapping topic. For example and in one embodiment, with a search query "credit," financial applications that index credit information on the client 202 may surface results grouped under a category "Credit Amount." In this example, because of the sensitive nature of the search, the search results would be from the local search index 206, which may be displayed without further identification, such as a password prompt or other form of identification (e.g., touch ID, facial recognition, and/or another form of identification).

In a further example and embodiment, a search result can be applications 208 that grouped by category. In this example, searching for the query "social," may surface the social network applications that are installed on the client 202. This can allow for quick navigation to multiple applications of this category without the need to type in each application name or navigate through one or more layers of organization structure (e.g., folders).

In another example, bundling of event sets on results from different applications can be made much easier and faster for a query such as "holidays," if each application marks their events with at least one topic tag as holiday. In a further example, news items may be grouped under categories such as "political," "sports," "local," and/or other types of news categories that may allow a finer granulation for users.

In these examples, which topics are used for the categorization originate from the application-based topics associated and indexed with the search results and not from a static categorization that attempts to fit the search results into this static type of categorization. This allows for a greater breadth of available topics can be used to categorize the search results. In addition, these application-originated topics can allow for a finer categorization of topics (e.g., "local," "breaking," "politics," "sports," "national," "foreign," etc., as opposed to a single new category.

In a further embodiment, the grouping module 212 generates groupings at the category level. For example and in one embodiment, the grouping module 212 can find that different collections of applications form clusters of at the category level, such as based on the items these applications index, the items a user interacts with, from App store information, and/or from aggregate user behavior observed in feedback. In this example, different email applications can form one cluster of categories, messaging applications can form another cluster, and media applications can another cluster of categories. The grouping module 212 can, in this embodiment, group the categories of each of these clusters for these applications together.

In one embodiment, the grouping module 212 uses the ranking probabilities to rank grouped search results. For example and in one embodiment, if search results 2, 5, 12, and 34 have the overlapping topic of "politics,", the grouping module 212 can use the ranking probabilities of the search results 2, 5, 12, and 34 to rank these search results within the presented category of "politics." In this example, by grouping the search results into one or more categories, lower ranked search results may be surfaced via the categorization mechanism.

In a further embodiment, the grouping module 212 can use a machine learning model to refine the dynamic coalescing of the topics. In one embodiment, the machine learning model use at least user engagement of search results, where each engagement is an indication that a user has engaged, rendered, or abandoned the URL associated with that engagement. In addition, this can be used with a user's browser history to build a user interest model that can reflect which topics are of interest to the user. In this embodiment, topics that are favored to the user can be preferentially used to group search results. For example and in one embodiment, if the user topic module shows a preference for news-type topics over shopping-type topics, if there were potential groupings for news-type topics vs. shopping-type topics, the grouping module would preferentially use the news-type topics instead of (or rank the news-type topic groupings higher than a shopping-type topic grouping).

In one embodiment, the topic model is private to the client and not sent to a server. In a further embodiment, the client topic model is generated as described in U.S. patent application Ser. No. 15/356,189, entitled "Client-Side Search Result Re-Ranking" filed on Nov. 18, 2016 and incorporated herein. In one embodiment, the ranking algorithm uses crowd sourced knowledge to get a generalized interest vector for users. This knowledge helps the client 202 determine what topics might be more relevant to a user given how other users have consumed that info. This approach can be extended to be more personalized by using on-device interaction information (e.g., the private client topic model). In one embodiment, this on-device data can be fed to machine learning approaches for classifying topics as 'Interested' and 'Not Interested'. The topics classified as 'Interested' can be shown with higher confidence in a user interface and can even be ranked higher.

By grouping the search results based on the topic information indexed with the donated content, this grouping is dynamic because the grouping is determined at the time the client 202 receives the search results and not based on static categories, such the domain that a search result resulted from. In one embodiment, donated items are annotated with a variety of tags with decreasing probability of each tag. Once a query is typed in, the results accumulated for the query are processed for their tags. A machine learning model, trained on a variety of result sets that were properly annotated, is used to infer the high-level categories for grouping results.

Once results are assigned to these high-level categories, the results can be ranked for display in a user interface. This dynamic categorization may result in generating different categories for the same query as on-device data and server result changes. For example and in one embodiment, consider a sample query for 'shoes.' If the user has applications for NIKE, ADIDAS, UNDER ARMOUR, and each of these applications donates items that describe shoes of different kinds like (sneakers, running, basketball), the machine learning model may pick sneakers and basketball shoes as two dynamic categories and categorize other results under 'Other options' category if is determined that the user is interested in basketball and lifestyle topics.

Figure 3:
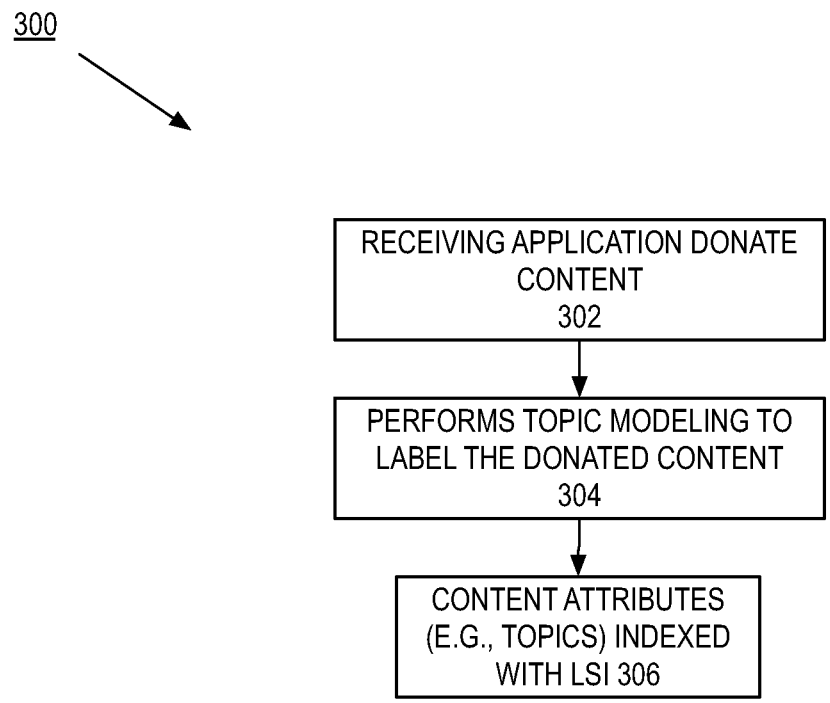
FIG. 3 is a flow diagram of one embodiment of a process to index donated content from locally installed applications.

FIG. 3 is a flow diagram of one embodiment of a process 300 to index donated content from locally installed applications. In one embodiment, a local search service indexes donated content from locally installed applications, such as the local search service 112 as described in FIG. 1 above. In FIG. 3, process 300 begins by receiving application donated content at block 302. In one embodiment, the application donated content can be metadata relating to one or more objects that are created, used, modified, and/or otherwise associated with the corresponding application as described in FIG. 1 above. At block 304, process 300 performs topic modeling to label the donated content. In one embodiment, process 300 can perform latent semantic analysis to determine topic for the donated content, determine topics based on application categories, using application donated tags, another mechanism to tag the donated content, and/or a combination therein. For example and in one embodiment, process 300 can perform latent semantic analysis to determine topic for the donated content, determine topics based on application categories, and/or using application donated tags as described in FIG. 2 above. Process 300 indexes the content attributes, including any relevant topic information, of the donated content in the local search index at block 306. For example and in one embodiment, process 300 indexes the content attributes (e.g., the application donated contents), including any relevant topic information, of the donated content in the local search index as described in FIG. 1 above.

Figure 4:
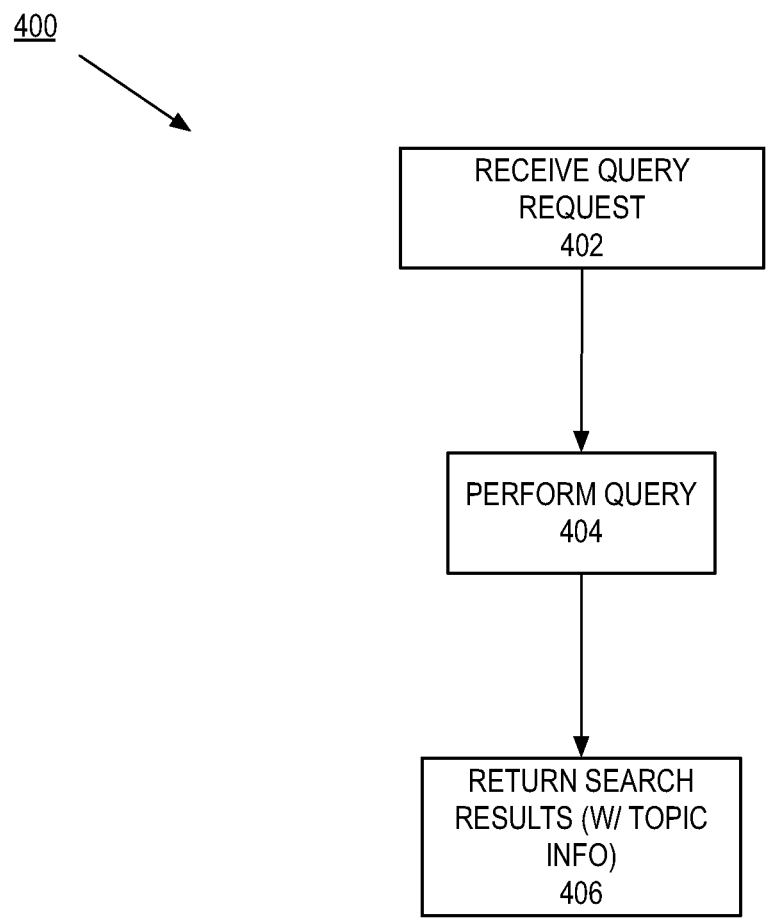
FIG. 4 is flow diagram of one embodiment of a process to process a query request.

With the topic information part of the local search index, this topic information can be surfaced in search results and used to group search results. FIG. 4 is flow diagram of one embodiment of a process 400 to process a query request. In one embodiment, a local search service processes a query request, such as the local search service 220 as described in FIG. 2 above. In FIG. 4, process 400 begins by receiving a query request at block 402. At block 404, process 400 performs that query using the local search index. Process 400 returns the search results at block 406. In one embodiment, one, some, or all of the search results can include topic information that is retrieved from the local search index.

Figure 5:
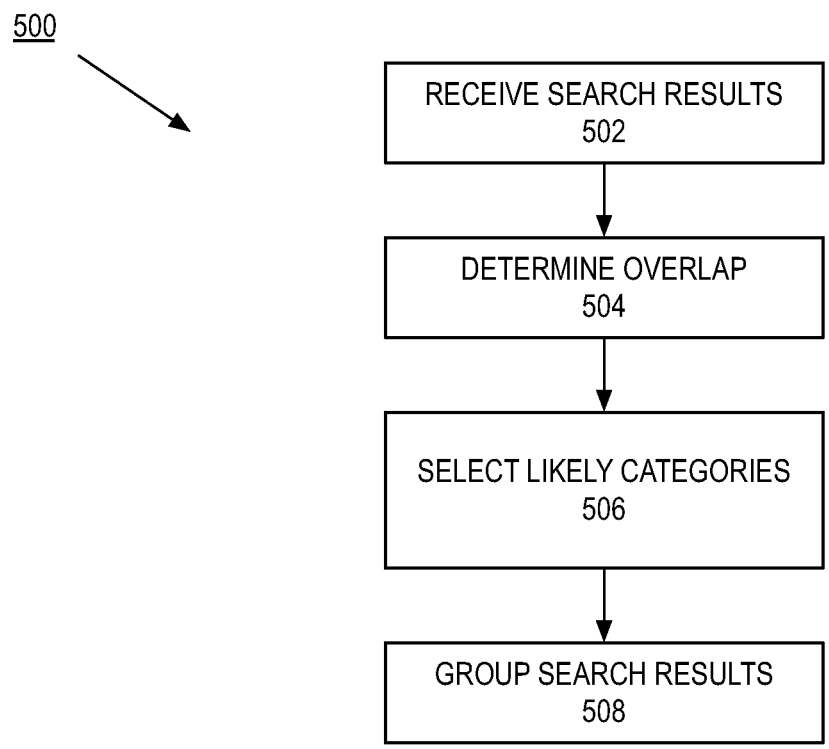
FIG. 5 is a flow diagram of one embodiment of a process to dynamically categorize search results.

FIG. 5 is a flow diagram of one embodiment of a process 500 to dynamically categorize search results. In one embodiment, a grouping module dynamically categorizes the search results, such as the grouping module 212 as described in FIG. 2 above. In FIG. 5, process 500 begins by receiving the search results at block 502. In one embodiment, the search results are from a local search index. In another embodiment, the search results are from a remote search server. Alternatively, the search results can be from both the local search index and a remote search server. At block 504, process 500 determines overlaps between sets of search results based on the topics for the search results. In one embodiment, process 500 matches topics between search results to determine the overlaps. For example and in one embodiment, if two or more search results have the same topics, these search results could be placed in the same category with a category name that is the matching topic. In another embodiment, process 500 groups search results that can similar topics. For example and in one embodiment, if there are two search results with news-related topics (e.g., "local politics" and "foreign politics"), these two search results can be grouped together in a "politics" or "news" category. In one embodiment, topics can be related using a set of well-known tags (e.g., WIKIPEDIA categories), an ontology (e.g., WORDNET), and/or another set of well-known tags.

At block 506, process 500 selects likely categories for grouping and presenting the search results. In one embodiment, process 500 selects the likely categories based on the ranking of the search results. In one embodiment, likely categories can be selected based on a personalized ontology available on device, from the search server, or some other mechanism. The search server gets crowd sourced data about engagements and can use that information to pick relevant categories for a given query. These categories can then be sent along with result set. Once on client, the machine learning model can pick the most relevant ones from this sub-list provided by search server.

In another embodiment, process 500 uses a predictive model to determine which of the categories to select and present. In this embodiment, the predictive model can be based on a user browser history and search engagement as described in FIG. 2 above. In addition, process 500 can determine the relative order of the search results within the selected category using the rank probabilities of the search results. Process 500 groups the search results at block 508. In one embodiment, process 500 groups the search results that match the selected one or more categories using the category name determined from the related topic. In this embodiment, the search results that not part of any of the selected categories can be presented outside of one of the selected categories. In addition, the search results in the selected category can be presented at the top of the list of search results (with the category name), in the middle of the list of search results, or at the bottom of the list of search results.

Figure 6:
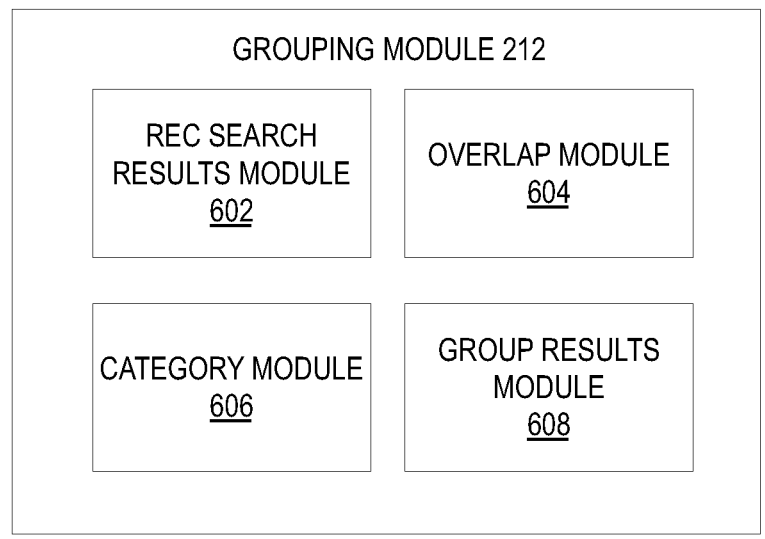
FIG. 6 is a block diagram of one embodiment of grouping module that dynamically categorizes search results.

FIG. 6 is a block diagram of one embodiment of grouping module 212 that dynamically categorizes search results. In one embodiment, the grouping module 212 includes receive search results module 602, overlap module 604, category module 606, and group results module 608. In one embodiment, the receive search results module 602 receives the search results as described in FIG. 5, block 502 above. The overlap module 604 determines topic overlaps as described in FIG. 5, block 504 above. The category module 606 selects likely categories as described in FIG. 5, block 506 above. The group results module 608 groups the search results as described in FIG. 5, block 508 above.

The present disclosure recognizes that the use of such personal information data, in the present technology, can be used to the benefit of users. For example, the personal information data can be used to re-rank search results that is of greater interest to the user. Accordingly, use of such personal information data enables calculated control of the search results. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Figure 7:
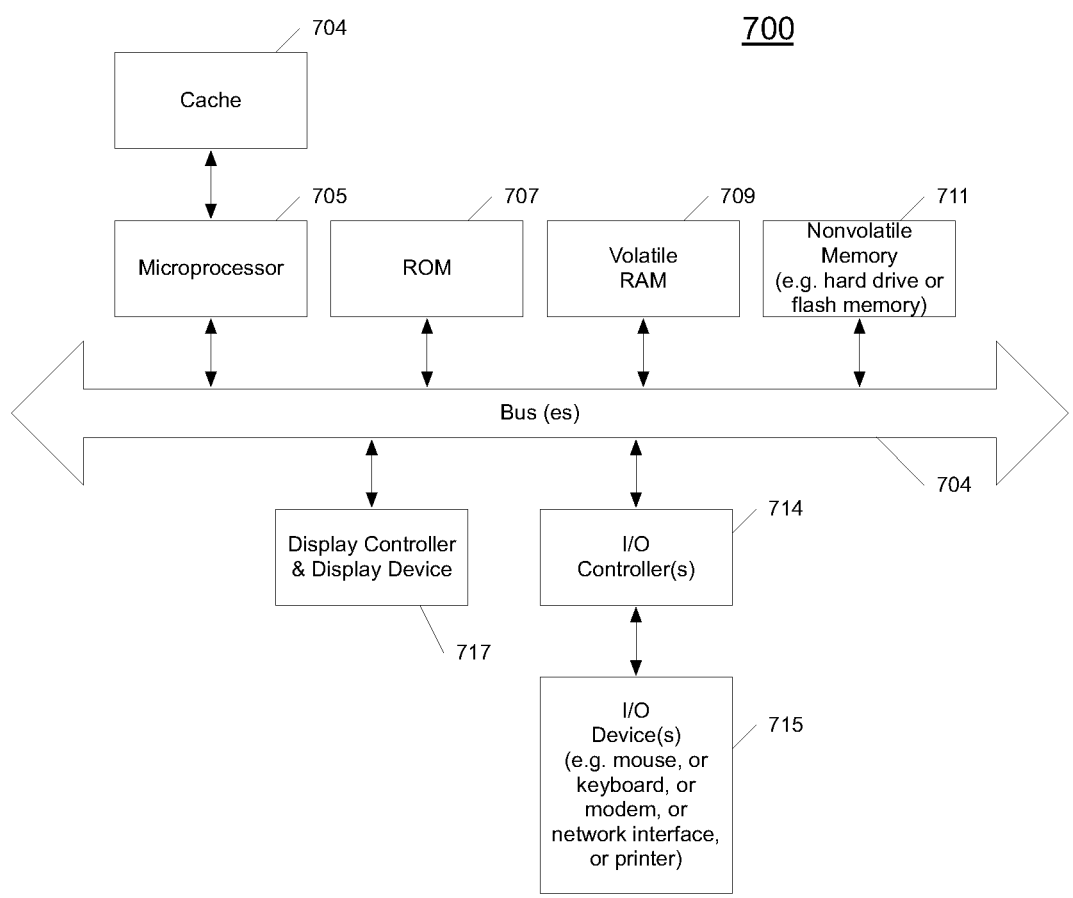
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a client 102 as shown in FIG. 1 or client 202 as shown in FIG. 2 above. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
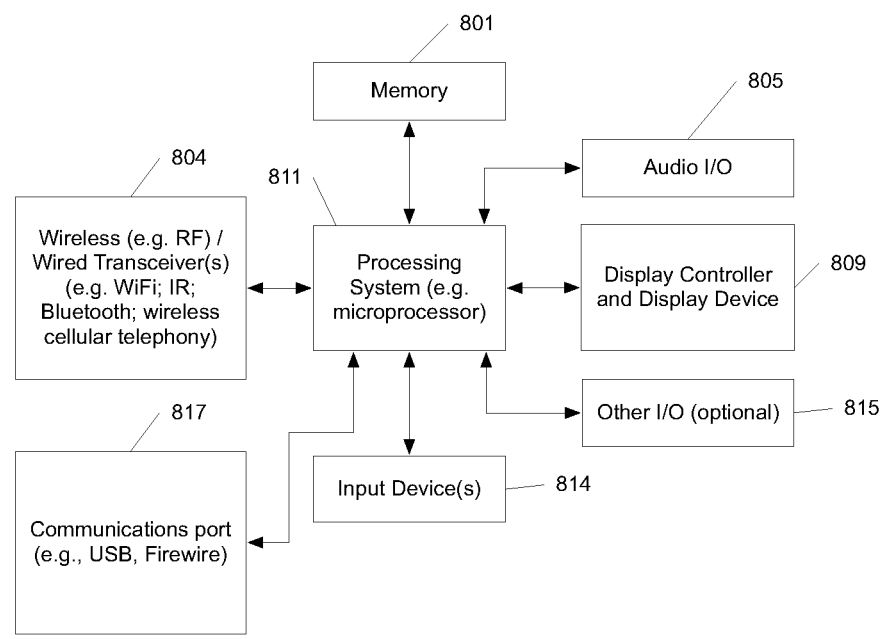
FIG. 8 shows an example of a data processing system, which may be used with one embodiment of the present invention.

FIG. 8 shows an example of another data processing system 800 which may be used with one embodiment of the present invention. For example, system 800 may be implemented as a client 102 as shown in FIG. 1 or a client 202 as shown in FIG. 2. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker for, for example, playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone when running the iOS operating system, etc. The system 800 also includes one or more wireless transceivers 803 to communicate with another data processing system, such as the system 800 of FIG. 8. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more communications ports 817 to communicate with another data processing system, such as the system 700 of FIG. 7. The communications port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 8.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "associating," "receiving," "determining," "computing," "sending," "performing," "categorizing," "indexing," "generating," "extracting," "adding," "retrieving," "presenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to index content from an application on an electronic device, the method comprising:
   receiving, with an electronic device, content for an application object from the application, wherein the content comprises metadata for the application object stored on the electronic device;
   associating a metadata tag for a topic to the content;
   storing the association between the content and the metadata tag in an on-device local search index of the electronic device, wherein the content in the on-device local search index remains local to the electronic device and the on-device local search index is not exposed to an external server;
   receiving a query search request and performing a query search for the query search request using the local search index to obtain a set of search results that includes the content; and
   causing a presentation of a category for at least some of the set of search results using at least the metadata tag of the content.

2. The non-transitory machine-readable medium of claim 1, wherein the application object is from an application locally installed on the electronic device.

3. The non-transitory machine-readable medium of claim 1, further comprising:
   generating the metadata tag for the content.

4. The non-transitory machine-readable medium of claim 3, wherein generating the metadata tag comprises:
   performing an analysis on the application object, wherein the analysis is selected from the group consisting of latent semantic analysis, explicit semantic analysis, latent Dirichlet allocation, hierarchical Dirichlet process, non-negative matrix factorization, and expectation maximization;
   extracting at least one topic from the analysis; and
   adding the at least one topic to the metadata tag for the application object.

5. The non-transitory machine-readable medium of claim 3, wherein generating the metadata tag comprises:
   retrieving an application category for the application; and
   adding the application category to the metadata tag as a topic for the application object.

6. The non-transitory machine-readable medium of claim 5, wherein the application category for the application is retrieved from an application store.

7. The non-transitory machine-readable medium of claim 3, wherein generating the metadata tag comprises:
   retrieving a set of tags from the application.

8. The non-transitory machine-readable medium of claim 7, wherein the application determines the set of tags based on at least a publicly set of available tags.

9. The non-transitory machine-readable medium of claim 1, wherein the content is metadata relating to objects used with the application.

10. A method to index content from an application on an electronic device, the method comprising:
    receiving, with an electronic device, content for an application object from the application, wherein the content comprises metadata for the application object stored on the electronic device;
    associating a metadata tag for a topic to the content;
    storing the association between the content and the metadata tag in an on-device local search index of the electronic device, wherein the content in the on-device local search index remains local to the electronic device and the on-device local search index is not exposed to an external server;
    receiving a query search request and performing a query search for the query search request using the local search index to obtain a set of search results that includes the content; and
    causing a presentation of a category for at least some of the set of search results using at least the metadata tag of the content.

11. The method of claim 10, wherein the application object is donated from an application locally installed on the electronic device.

12. The method of claim 10, further comprising:
    generating the metadata tag for the content.

13. The method of claim 12, wherein generating the metadata tag comprises:
    performing an analysis on the application object, wherein the analysis is selected from the group consisting of latent semantic analysis, explicit semantic analysis, latent Dirichlet allocation, hierarchical Dirichlet process, non-negative matrix factorization, and expectation maximization;
    extracting at least one topic from the analysis; and
    adding the at least one topic to the metadata tag for the application object.

14. The method of claim 12, wherein generating the metadata tag comprises:
    retrieving an application category for the application; and
    adding the application category to the metadata tag as a topic for the application object.

15. The method of claim 14, wherein the application category for the application is retrieved from an application store.

16. The method of claim 12, wherein generating the metadata tag comprises:
    retrieving a set of tags from the application.

17. The method of claim 16, wherein the application determines the set of tags based on at least a publicly set of available tags.

18. The method of claim 10, wherein the content is metadata relating to objects used with the application.

19. An electronic device to index content from an application on the electronic device, the electronic device comprising:
    at least one processor;
    memory coupled to the processor through a bus; and
    a process executed from the memory by the processor that causes the processor to:
      receive, with an electronic device, content for an application object from the application, wherein the content comprises metadata for the application object stored on the electronic device;
      associate a metadata tag for a topic to the content;
      store the association between the content and the metadata tag in an on-device local search index of the electronic device, wherein the content in the on-device local search index remains local to the electronic device and the on-device local search index is not exposed to an external server;
      receive a query search request and performing a query search for the query search
      request using the local search index to obtain a set of search results that includes the content; and
      cause a presentation of a category for at least some of the set of search results using at least the metadata tag of the content.

20. The electronic device of claim 19, wherein the content is metadata relating to objects used with the application.

21. The non-transitory machine-readable medium of claim 1, wherein the content in the on-device local search index is not exposed to the external server.

22. The method of claim 10, wherein the content in the on-device local search index is not exposed to the external server.

23. The electronic device of claim 19, wherein the content in the on-device local search index is not exposed to the external server.

* * * * *